H. S. OSBORNE AND W. H. MARTIN.
MEANS FOR AND METHOD OF MEASURING WEAK CURRENTS.
APPLICATION FILED FEB. 26, 1917.

1,366,414.

Patented Jan. 25, 1921.
3 SHEETS—SHEET 1.

INVENTORS
*H. S. Osborne & W. H. Martin*
BY
*Thomas D. Lockwood*
ATTORNEY

INVENTORS
H.S. Osborne & W.H. Martin
BY
Thomas D. Lockwood
ATTORNEY

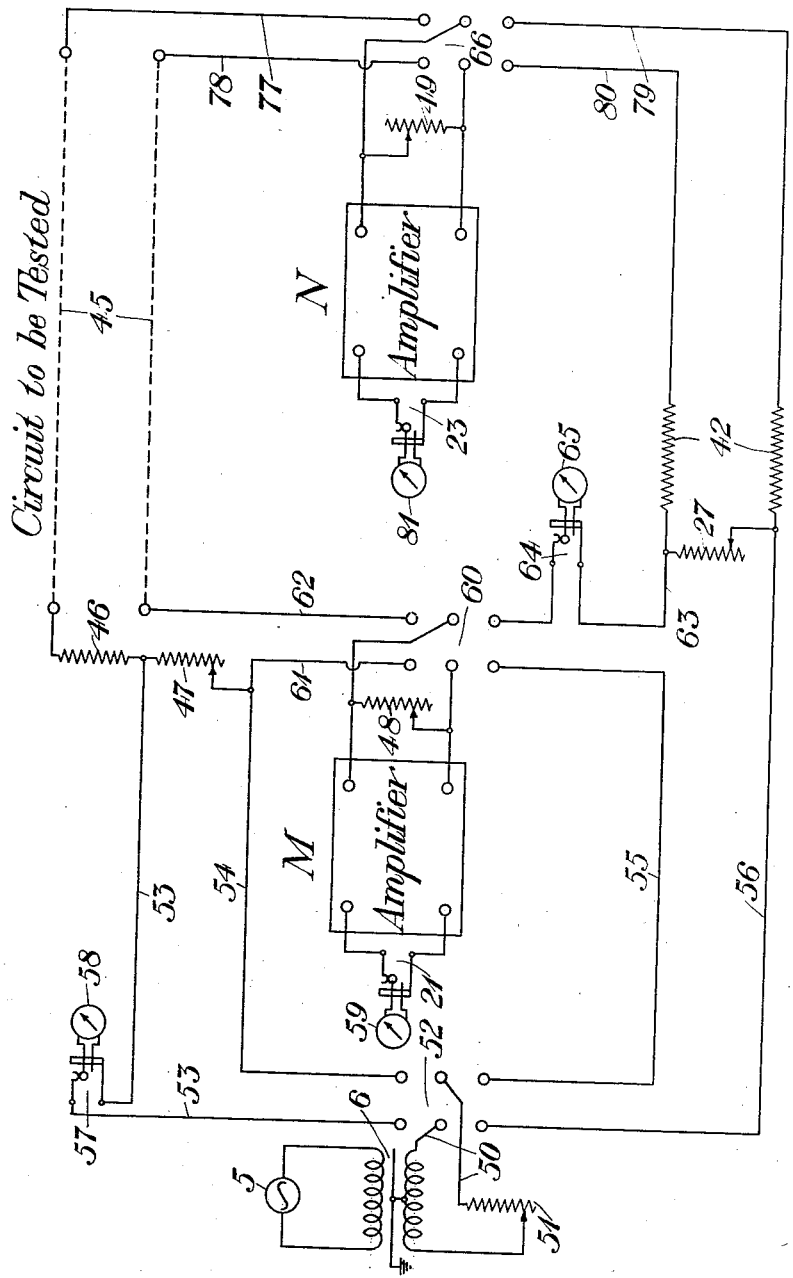

UNITED STATES PATENT OFFICE.

HAROLD S. OSBORNE AND WILLIAM H. MARTIN, OF NEW YORK, N. Y., ASSIGNORS TO AMERICAN TELEPHONE AND TELEGRAPH COMPANY, A CORPORATION OF NEW YORK.

MEANS FOR AND METHOD OF MEASURING WEAK CURRENTS.

1,366,414.  Specification of Letters Patent.  Patented Jan. 25, 1921.

Application filed February 26, 1917. Serial No. 151,050.

*To all whom it may concern:*

Be it known that we, HAROLD S. OSBORNE and WILLIAM H. MARTIN, both residing at New York city, in the county of New York and county of Bronx, respectively, and State of New York, have invented certain Improvements in Means for and Methods of Measuring Weak Currents, of which the following is a specification.

This invention relates to the measurement of electric current, particularly weak attenuated currents such as those occurring in telephone circuits. Heretofore it has been difficult or impossible to accurately measure currents of this character because of their small magnitude as compared with the range of commercial measuring instruments, so that a large factor of error was always present. By means of the present invention it is proposed to amplify these extremely weak currents by means of a distortionless amplifier, to magnitudes such that they will affect commercial measuring instruments over a wider portion of the range of the instrument, thereby decreasing the factor of error. By thus amplifying the weak currents without distortion it is also possible to make an oscillogram of the amplified current which is an accurate representation of the form of the original wave, or otherwise determine the wave form of very minute alternating currents.

A further feature of the invention consists in the provision of means whereby the distortionless amplifier, the amplification of which is somewhat variable from time to time, may be readily calibrated to determine its amplification under the conditions present during the test.

Figure 2:
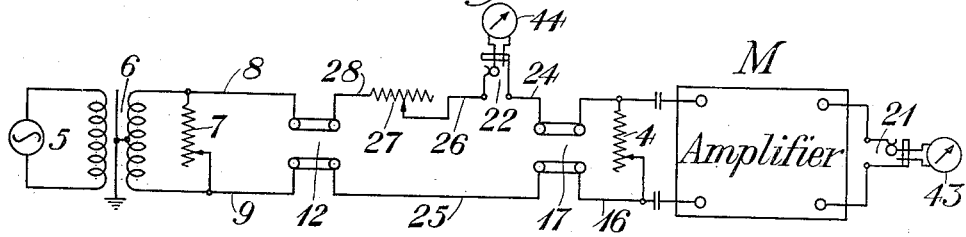
Figure 3:
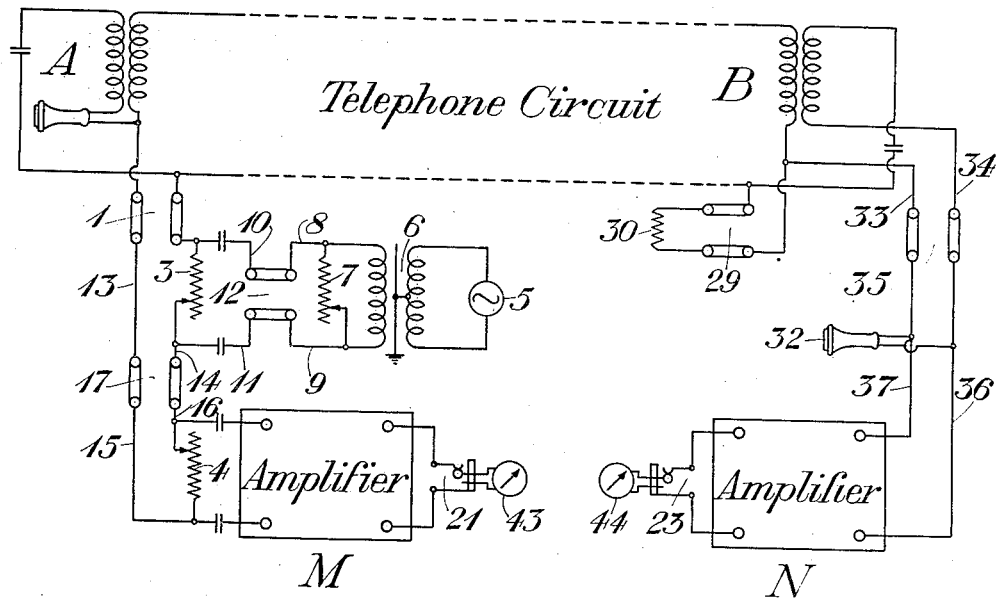
Figure 4:
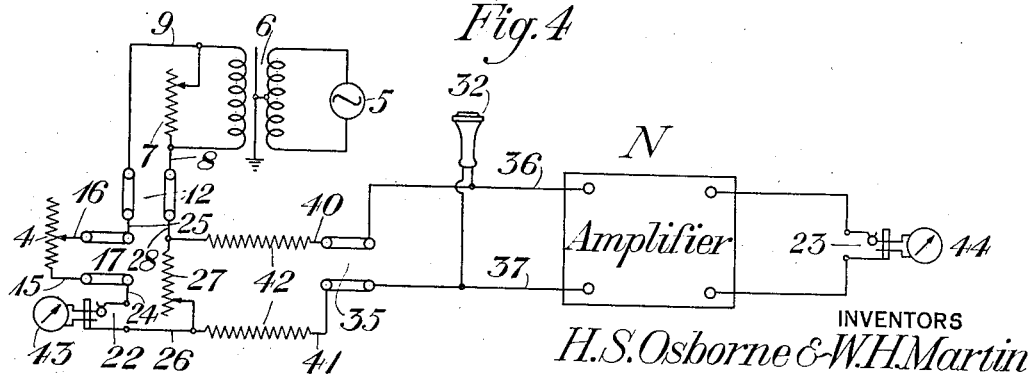

These results are obtained by means of the organizations disclosed in the appended drawings, Figure 1 of which is a diagrammatic representation of one exemplification of the invention; Figs. 2, 3 and 4 are simplified diagrams indicating the circuit conditions during different stages of the operation; and Fig. 5 is a diagrammatic illustration of a more general form of the invention.

Referring to Fig. 1, for testing purposes a telephone circuit may be set up, consisting of subscribers' sets A and B which are interconnected through subscribers' loops C and D, cord circuits E and F, and a trunk G, all conforming to a standard arrangement well known in the art. At the substation A a switch 1 is provided whereby the transmitter 2 may be disconnected and an electrical equivalent for applying voltage to the telephone line may be substituted. This equivalent consists of resistances 3 and 4 which are adjustable together as one unit and have a combined impedance equal to that of the transmitter 1, the resistance 3 being adapted to be bridged by a source of current consisting of a generator 5, connected through a shielded transformer 6 to the terminals of a variable resistance 7 bridged across conductors 8 and 9, which may be connected to conductors 10 and 11 leading to the terminals of resistance 3 by means of switch 12. From one terminal of resistance 3 and a pole of switch 1, conductors 13 and 14 are led, said conductors being connected to the terminals of resistance 4 by means of conductors 15 and 16 and a switch 17. Connected to the terminals of resistance 4 is an amplifying apparatus generally designated as M, said apparatus comprising a series of vacuum tube amplifiers 18, 19 and 20 arranged in tandem, tubes 18 and 19 being voltage amplifiers, while 20 is a high current tube functioning as a current amplifier. These tubes are designed, and their circuits are arranged, in a manner well known in the art, to amplify oscillations impressed across the terminals of the first tube 18 of the series without the distortion incident to other amplifiers heretofore known, thereby delivering to the terminals of a jack 21 amplified oscillations whose wave form is a faithful reproduction of the input wave.

The switch 17 above referred to is also arranged to connect the conductors 15 and 16 leading to the input side of the amplifier to conductors 24 and 25, the former leading to one terminal of jack 22, the other terminal of the jack being connected through conductor 26, variable resistance 27 and conductor 28 to a pole of switch 12. The source of current 5 may therefore be connected so as to produce a voltage drop across the resistance 4 at the input terminal of the amplifier M through switches 12 and 17 and the current flow in the circuit may be read on an alternating current millammeter connected to the jack 22. The input impedance of the amplifier is so high as to be comparable to an infinite impedance in shunt of the resistance 4 so that substantially the full current flows through said resistance.

At the second subscriber's set B a switch 29 is provided whereby an equivalent resistance 30 may be substituted for the transmitter 31 during the test. Instead of connecting the receiver 32 directly in circuit as at station A, conductors 33 and 34 lead to a switch 35 by means of which they may be connected to conductors 36 and 36' leading to the input terminals of a distortionless amplifier designated generally as N, the receiver 32 being bridged across said conductors. The input circuit of the amplifier is of high impedance as compared with the receiver 32 so that substantially the full received current flows through the receiver. The amplifier N consists of tubes 37, 38 and 39 and is of the same construction as amplifier M so as to amplify without distortion the oscillations impressed upon the receiver 32, said oscillations being amplified to a value such that they may be directly read upon an alternating current milliammeter connected to the jack 23 which is bridged across the output circuit of the amplifier.

The switch 35 is also arranged to connect the terminals of receiver 32 to conductors 40 and 41 and through resistances 42 to the source of current 5 independent of the artificial telephone circuit, so that a voltage from said source is applied through switches 12 and 17 to the terminals of resistance 27 across which the receiver is bridged and by variation of said resistance the voltage applied to the receiver may be varied.

The operation of the apparatus above described is as follows:

Assuming that it is desired to impress upon the telephone circuit a current of $i$ milliamperes, and remembering that the amplification of the amplifier M which is to be used in measuring this current is unknown, the first step is to determine the amplification of the amplifier M. In order to do this switch 12 is thrown to the right and switch 17 to the left and milliammeters 43 and 44 are plugged into jacks 21 and 22. The circuit resulting from this manipulation is shown in simplified form in Fig. 2. From this circuit it is evident that an alternating voltage from source 5 is impressed through transformer 6 upon the terminals of resistance 7, which causes an alternating current to flow in the circuit leading to the input terminals of amplifier M which serially includes resistance 27, milliammeter 44 and resistance 4. Resistance 7 is now adjusted until the instrument 44 indicates that a current of $n\,i$ milliamperes is flowing in this circuit where $n\,i$ is some multiple of the desired current $i$ and of such value as to be readily measured by the instrument 44. Care should be taken to keep the resistance of 4 fairly low, say one or two ohms. The current flowing in the output circuit may now be read upon milliammeter 43. Assuming this reading to be $i_1$ milliamperes, it will be seen at once that when a current $n\,i$ is flowing in the input circuit of amplifier M with resistance 4 at its present adjustment, a current $i_1$ will flow in the output circuit. If, however, the resistance 4 be now adjusted to $n$ times its present value and a voltage be applied to the amplifier M sufficient to give a current $i_1$ in the output circuit, the input current will be $i$.

Amplifier M having been calibrated the next step is to apply a current $i$ to the transmitting side of the telephone circuit and determine the amount of current flowing at the receiving end. Accordingly switch 12 is thrown to the left, switches 1 and 17 to the right, switch 29 to the left and 35 to the right. Milliammeters 43 and 44 are inserted in jacks 21 and 23. The circuit as thus adjusted appears in simplified form in Fig. 3. Resistance 4 will now be adjusted to $n$ times its original value and the resistance 3 is then so adjusted that the combined impedance of resistances 3 and 4 will be equal to that of the transmitter. A voltage from source 5 is now impressed across the terminals of resistance 3 so that a current flows through resistance 4 to the telephone circuit. The current measuring set comprising amplifier M and milliammeter 43 being bridged across resistance 4 will measure the current flowing through resistance 4 to the telephone line. The input impedance of the amplifier is so high that no current is diverted through the amplifier. Resistance 7 may now be adjusted until an indication of $i_1$ milliamperes is registered on instrument 43, which means that a current of $i$ milliamperes is flowing to the telephone line. The receiver 32 at the receiving end of the line is bridged by a current measuring set comprising amplifier N and milliammeter 44 so that should an indication of $i_2$ milliamperes appear on the instrument 44 said indication would be proportional to the current in the receiver 32, and at the same time none of the received current would be diverted from the receiver into the amplifier N owing to the high input impedance of the latter. If instead of milliammeters 43 and 44 oscillographs are connected to jacks 21 and 23, oscillograms may be made which are amplified but faithful copies of the current entering the telephone line at the transmitting end and the current flowing through the receiver 32 at the receiving end. In this manner the wave form of these two currents may be compared.

The reading given by the instrument 44 is proportional to the current in the receiver 32 but as the amplification of amplifier N is unknown it is necessary to calibrate this amplifier in order to determine the units of current actually flowing through the receiver. Accordingly switch 12 is thrown to the right, and switches 17 and 35 to the left, instruments 43 and 44 being inserted in jacks 22 and 23, the resulting circuit being represented in simplified form in Fig. 4. The source 5 is now applied to the receiver circuit through switches 12, 17 and 35 said circuit including a high resistance 42. A current now flows from one terminal of resistance 27 through resistance 42 and receiver 32 back to the other terminal of resistance 27. By varying resistances 7 and 27 until a reading of $i_2$ milliamperes is obtained on instrument 44 it is evident that the current now flowing through the receiver is equal to the current which flowed from the line through the receiver. Instrument 43 may now be read, the reading giving the current flowing through resistance 27. Assuming this reading to be $i_3$ milliamperes and further assuming that resistance 27 is set to $r$ ohms and the combined resistance of resistance 42 and receiver 32 is $r_1$ ohms, then, since the drop of potential through 27 must equal the drop through resistances 42 and the receiver, the current $i_4$ flowing through the receiver may be obtained from the equation $i_3 r = i_4 r_1$. It will be noted that by making the resistance 42 large and the regulating resistance 27 small, the current flowing through the instrument 43 will be large as compared with the receiver current so that the receiver current, which is too small for measurement, may be determined from a fairly high current reading on the instrument 43.

A more general form of the invention is illustrated in Fig. 5, in which the circuit over which the test is to be made is schematically indicated by the dotted lines at 45. In testing the current flowing over this circuit it may be desirable that it be connected to impedances at each end substantially equal to its own impedance and for this purpose fixed resistance 46 and variable resistances 47 and 48 are arranged across the terminals of circuit 45 at the transmitting end, while a variable resistance 49 is arranged across the receiving terminals, it being understood that said resistances may be adjusted so that the total resistance of 46, 47 and 48 may be made equal to the resistance of 49, which in turn may be made substantially equal to the characteristic impedance of the tested circuit, or may be adjusted to any other value which is found desirable under certain conditions.

A source of alternating current 5 works through a transformer 6 into a circuit 50 provided with a regulating resistance 51, and a switch 52 is provided by which said source may be applied either to conductors 53 and 54 leading to the terminal of resistance 47, or to conductors 55 and 56. A jack 57 in which a milliammeter 58 may be inserted is provided in conductor 53. An amplifier M, constructed in the same manner as the amplifier M of Fig. 1 is connected across the terminals of resistance 48, a jack 21 being provided in its output circuit for the insertion of milliammeter 59. A switch 60 is provided to connect the input terminals of the amplifier either to conductors 61 and 62 leading to the test circuit 45, or to conductors 55 and 63, a jack 64 for the insertion of a milliammeter 65 being provided in the latter conductor.

An amplifier N, similar to amplifier N of Fig. 1 is connected to the terminals of resistance 49 and a switch 66 is provided whereby the amplifier may be connected either to conductors 77 and 78 leading from the receiving end of test circuit 45, or to conductors 79 and 80 leading through resistance 42 to the terminals of a variable resistance 27 bridged across conductors 56 and 63. A jack 23 for the insertion of a milliammeter 81 is provided in the output circuit of amplifier N.

The operation is as follows: Assuming that it is desired to apply a current of $i$ milliamperes to the test circuit 45, the amplifier M must first be calibrated so that it may be known from the reading of the current in its output circuit, that a current of $i$ milliamperes is applied to the input circuit. Accordingly switches 52 and 60 are thrown to lower position connecting source 5 to the terminals of resistance 48. Resistance 48 is set to a low value, say one or two ohms and resistance 51 is now adjusted until instrument 65 indicates that a current of $n\,i$ milliamperes is flowing in the input circuit of the amplifier. The indication of instrument 59 is then noted and assuming this indication to be $i_1$ milliamperes, it is at once known that a reading of $i_1$ on the output circuit of the amplifier indicates a current of $n\,i$ milliamperes in the input circuit with resistance 48 at its low adjustment. Resistance 48 may then be adjusted to a value $n$ times as great as the original setting when a current of value $i_1$ in the output indicates a current $i$ in the input.

Switches 52, 60 and 66 are now thrown to their upper position, connecting source 5 across the terminals of resistance 47 through conductors 53 and 54. The resistance 48 being now set to a value $n$ times as great as its original value, resistances 46 and 47 are adjusted until the total resistance of 46, 47 and 48 is equal to that of 49. Resistance 51 is then adjusted until a reading of $i_1$ milliamperes occurs at instrument 59 which indicates that a current of $i$ milliamperes is flowing to the telephone circuit, since the resistance 48 across which this indication is measured is now serially included in the telephone circuit. The reading of milliammeter 81 may now be noted, the indication of $i_2$ milliamperes on this instrument being proportional to the current received at the receiving end of the telephone circuit, since the resistance 49 across which this measurement is taken is serially included in the receiving end of the circuit.

As the amplification of amplifier N is unknown it is necessary to calibrate this amplifier in order to translate this reading into units of current flowing in the receiving circuit. For this purpose switches 52, 60 and 66 are thrown to their lower positions, the source 5 being applied to the input terminals of the amplifier N through the net-work consisting of resistances 27 and 42 independently of the telephone circuit 45. Resistances 27 and 51 are now adjusted until an indication of $i_2$ milliamperes occurs on instrument 81, whereupon the current flowing through the resistance 27 may be read on instrument 65. Assuming this reading to be $i_3$ milliamperes, and the resistance of 27 to be $r$ ohms while the combined resistances of 42 and 49 is $r_1$ ohms the current $i_4$ flowing through the resistance 49 may be obtained from the equation $i_3 r = i_4 r_1$. The current $i_4$ must be the current received at the receiving end of the telephone circuit as it is the current at the input of the amplifier when the latter gives a reading of $i_2$.

It will be seen from the foregoing that a simple and effective means has been provided for accurately measuring currents which are too small to affect ordinary measuring instruments, and while the means for accomplishing this result has been shown as embodied in certain forms, it will be understood that it may be incorporated in many and widely different embodiments without departing from the spirit of the invention as defined in the following claims.

What is claimed is:

1. The method of measuring currents too weak for direct measurement, which consists in amplifying the currents without distortion, determining the degree of amplification, and measuring the amplified currents.

2. The method of measuring currents too weak for direct measurement which consists in impressing the currents to be measured upon a circuit, shunting a portion of said circuit by an impedance of substantially infinite value as compared with the portion shunted, translating the potential differences existing across the shunt terminals into amplified currents which are faithful copies of the currents to be measured, determining the degree of amplification, and measuring such amplified currents.

3. The method of comparing the magnitude of current waves too weak for direct measurement impressed upon a circuit, with that of the corresponding waves received therefrom, which consists in amplifying the transmitted waves without distortion, amplifying the received waves without distortion, determining the degree of amplification in both cases, and indicating the magnitudes of the two sets of amplified waves.

4. The method of measuring weak currents which consists in impressing current variations upon a test circuit of unknown constants, amplifying the corresponding currents received from the test circuit, measuring the amplified waves, impressing similar variations upon a circuit of known constants, amplifying the waves received from the latter circuit, measuring the amplified waves from the latter circuit, and adjusting the known constants until the same measurement is given from both circuits.

5. The method of testing which consists in setting up week current variations in an apparatus to be tested, amplifying such variations, measuring the amplified variations, setting up similar variations in an apparatus of known constants, amplifying the latter variations, measuring the variations so amplified and adjusting the known constants until the same measurement is given in both cases.

6. The method of calibrating an amplifier having an input and an output circuit, which consists in producing a measurable flow of current, applying a definite fraction of said current which is too small to be measured to the input circuit of the amplifier, and measuring the resultant current flow in the output circuit.

7. An apparatus for measuring currents too weak for direct measurement, comprising means for amplifying the currents without distortion, means for determining the amplification of said amplifying means, and indicating means associated with said amplifying means for indicating the amplitude of amplified currents.

8. An apparatus for measuring currents too weak for direct measurement, comprising a circuit, means for impressing weak current variations thereon, and amplifying means connected in shunt with a portion of said circuit, the impedance of the amplifying means being so high as to be substantially infinite as compared with the portion shunted, means for determining the amplification of said amplifying means, and an indicator associated with said amplifier.

9. A current measuring system comprising a test circuit, means to impress current variations thereon, a second circuit having known constants, means for impressing similar variations on said second circuit, means for amplifying the currents received from both circuits, means for indicating both sets of amplified currents, and means for adjusting the known constants of the second circuit until the same indication is given for both sets of amplified variations.

10. A testing system comprising an apparatus to be tested, means to set up current variations therein, a second apparatus having known constants, means for setting up current variations therein, means for amplifying both sets of variations, means for indicating the amplified variations, and means for adjusting the known constants until the same indication is given for both sets of variations.

11. A testing system comprising a test circuit, means to impress thereon current variations too weak for direct measurement, means to amplify without distortion the impressed variations, means to amplify without distortion the variations received from the test circuit, means to determine the degree of amplification in both cases, and means to indicate the amplitudes of both sets of amplified variations, whereby the transmitted and received variations may be compared.

12. A testing system comprising an amplifier, means to apply thereto current variations too weak for direct measurement, means to indicate the amplitude of the applied variations, means to indicate the amplitude of the amplified variations, whereby the two may be compared, a test circuit, means to apply current variations thereto, means to associate the amplifier with the latter means so that the amplitude of the variations applied to the test circuit may be indicated, a second amplifier, means to apply variations received from the test circuit thereto, means to determine the amplification of said second amplifier, and means to indicate the amplified variations received from the test circuit.

13. A testing system comprising an amplifier, means to apply current variations thereto, means to indicate the applied variations, means to indicate the amplified variations, whereby the two may be compared, a test circuit, means to apply current variations thereto, means to associate the amplifier with the latter means so that the applied variations may be indicated, a second amplifier, means to apply variations received from the test circuit thereto, means to indicate the amplified variations received from the test circuit, an auxiliary circuit, means to apply current variation thereto, means to indicate the applied variations, means to apply variations received from the auxiliary circuit to the second amplifier, and means to adjust said circuit until the amplified variations from the auxiliary circuit give the same indication as the amplified variations from the test circuit.

14. An apparatus for measuring weak currents comprising a test circuit from which the weak current variations are received, means to amplify the variations, means to indicate the amplified variations, an auxiliary circuit comprising a high resistance and low resistance path in parallel, means to apply current variations to said circuit whereby comparatively strong currents flow in the low resistance path and comparatively weak currents flow in the high resistance path, means to impress the latter variation upon the amplifying means, means to adjust the currents flowing in the auxiliary circuit until the currents flowing in the high resistance circuit when amplified produce the same indications as the amplified variations from the test circuit, and means to indicate the comparatively strong current flowing in the low resistance circuit.

15. A testing system comprising an amplifier, means to apply current variations thereto, means to indicate the amplitude of the applied variations, means to indicate the amplitude of the amplified variations, whereby the two may be compared, a test circuit, means to apply thereto current variations too weak for direct measurement, and means to associate the amplifier with the latter means so that the amplitude of the applied variations may be indicated.

In testimony whereof, we have signed our names to this specification in the presence of two subscribing witnesses, this 13th day of February 1917.

HAROLD S. OSBORNE.
WILLIAM H. MARTIN.

Witnesses:
ALFRED KAUFMANN,
EDMUND SCHILP.